United States Patent
Bischoff et al.

[11] Patent Number: 5,808,856
[45] Date of Patent: Sep. 15, 1998

[54] HIGH ENERGY MULTILAYER CERAMIC CAPACITOR

[75] Inventors: William P. Bischoff, San Marcos, Calif.; Michael G. Bischoff, Richwood, Tex.

[73] Assignee: Microelectronic Packaging, Inc., San Diego, Calif.

[21] Appl. No.: 766,224

[22] Filed: Dec. 12, 1996

Related U.S. Application Data

[62] Division of Ser. No. 475,967, Jun. 7, 1995, Pat. No. 5,603,147.

[51] Int. Cl.$^6$ .................................................. H01G 4/06
[52] U.S. Cl. .................................. 361/321.4; 361/321.1; 361/321.5; 361/313
[58] Field of Search ........................... 361/311–314, 320, 361/321.1, 321.2, 321.3, 321.4, 321.5, 322; 257/295; 365/145, 149; 29/25.42

[56] References Cited

U.S. PATENT DOCUMENTS 5,512,353  4/1996  Yokotani et al. ...................... 428/210

OTHER PUBLICATIONS

Cross et al., *Dielectric and Mechanical Loss In The System*, Mat. Res. Bull., vol. 3, pp. 877–884 (1968).
Bar–Chaim et al., *Variations of The Dielectric Constant of PZT . . . With Electric Field*, Ferroelectrics, vol. 6, pp. 299–305 (1974).
Thomas, *A New Framework . . . Ferroelectrics*, J. Phys. Chem. Solids, vol. 51, No. 12, pp. 1419–1431 (1990).
Zhou et al., *The Thermo–Mechanical Breakdown of Ferroelectric Ceramics*, Proc. of 3rd Int'l. Conf. on Properties and Applns. of Dielectric Mtls., Tokyo, Japan, pp. 1192–1194 (1991).
Burn, *Ceramic Capacitor Dielectrics*, Engineered Materials Handbook, vol. 4, Ceramic & Glass, pp. 1112–1118 (1991).
Stumpe, *Electrical Properties of Surface Layers of Oxidic Perovskites*, Ferroelectrics, vol. 131, pp. 155–162 (1992).
Elissalde et al., *Correlation Between Dielectric Properties and Nanostructure in a $Pb(In_{1/2}Nb_{1/2})O_3$ Ceramic*, Mater. Sci. Eng., B25, pp. 85–91 (1994).
Elissalde et al., *Dielectric Relaxations in Ceramics . . .* , Mater. Sci. Eng., B22, pp. 303–309 (1994).

*Primary Examiner*—Bot L. Ledynh
*Attorney, Agent, or Firm*—Baker, Maxham, Jester & Meador

[57] ABSTRACT

A high energy multilayer ceramic capacitor formed of alternating ceramic and electrode layers, the capacitor being suitable for use in implantable medical devices. The ceramic layers are comprised of a dielectric composition of lead magnesium niobate with small amounts of dopants, namely, lithium niobate, copper oxide, magnesium titanate, manganese niobate, and zirconium oxide, with appropriate electrical terminations connected to the electrode layers. The capacitor thus fabricated exhibits greatly reduced ferroelectric effect, namely, less than 30% over a bias range of 0–1,000 volts. It has a breakdown voltage of at least 700 volts, a leakage current less than 10 pico amps at 1,000 volts, an energy density of greater than 10 J/cc, has a rectangular form factor 1.5 inches by 2.0 inches by 0.06 inch thick, and weighs no more than 30 grams.

20 Claims, 3 Drawing Sheets

HIGH ENERGY MULTILAYER CERAMIC CAPACITOR

This is a divisional of application Ser. No. 08/475,967 filed on 7 Jun. 1995, now U.S. Pat. No. 5,603,147.

BACKGROUND

1. Field of the Invention

This invention relates generally to multilayer ceramic capacitors, and more particularly to a long life, high energy, multilayer ceramic capacitor having a high dielectric constant and of a reduced size to be highly suitable for implantation in the human body.

2. Discussion of the Related Art

Multilayer ceramic capacitors have been available having a variety of electrical characteristics. Barium titanate ($BaTiO_3$) has commonly been used for ceramic multi-layer capacitors. This base body material, or possibly several alternative dielectric materials, coupled with specifically identified additives, are discussed in Burn, *Ceramic Capacitor Dielectrics,* in Engineered Materials Handbook, Vol. 4, *Ceramics and Glasses,* ASM International (1991). These capacitors have generally had certain limitations which made them unsuitable for implantation in the human body, for example, as part of a cardiac defibrillator. Heart pacers and defibillators are included within the term "implantable medical devices." In general, ceramic capacitors lacked the energy density required to support the primary discharge for defibrillators.

For implantable medical devices, which typically require short duration high energy pulses, a major portion of the power supply for these devices is a capacitor. A defibrillator, for example, uses a capacitor to be charged and store energy from the battery, and then release this energy in the form of an electrical therapy pulse to the heart. The primary discharge source for defibrillators has been relatively large electrolytic capacitors. These have been used with implantable medical devices because they are able to achieve at least some of the major parameters necessary for such an environment. However, these capacitors have significant limitations for defibrillator use. Their size has been a major drawback. Such implantable electrolytic capacitors would typically be about 0.63 inches in diameter and about 1.9 inches long and would weight about 14.7 grams. Two such capacitors would be required to achieve the energy level, 30 J at 700 volts, required for defibrillators. The two electrolytic capacitors typically have a volume of about 28 cc. Because of their cylindrical shape, another 10 cc is wasted so their effective volume is about 38 cc. The reason such a capacitor must be of this relatively large size is that electrolytics typically have an energy density of 1–2 J/cc, so making it large is the only way to obtain the required 30 J energy level. Because of its size, a defibrillator with such electrolytic capacitors could only be implanted in the abdomen of a person, requiring electrical wires to extend from that location to the electrodes at the heart.

Electrolytic capacitors have other potential disadvantages. They tend to outgas, so provisions must be made in the implanted device to contain and neutralize such gases. Further, electrolytics need to be reformed on a periodic basis. This requires that a voltage be applied and held for a predetermined period of time, thereby reducing the useful life of the battery in the implanted device. Their useful life is about five years, so periodic replacement is necessary. The leakage current of implantable electrolytic capacitors is typically 0.1–1.0 ma and their dissipation factor is as high as about 10%.

Because of various considerations, it is desirable that the electrical wire extending from the implanted device to the cardiac muscle be as short as possible. Also, the operation to implant a device in the upper chest is much more minor than is the abdominal operation necessary to implant a large device. Due to the relatively large size of the capacitors as a portion of the overall implanted device, it has not previously been possible to implant the device in relatively near proximity to the heart.

Characteristic limitations in multilayer ceramic capacitors in the past have made them not suitable for the primary high capacitance, high voltage discharge required for defibrillators. Among these limitations are relatively low dielectric constant, in the range of 2,000 to 4,000 at operational temperature, leakage current of several hundred microamps, low capacitance, typically less than 20 $\mu f$, and relatively low breakdown voltage of not greater than 30 volts. They were not able to deliver 30 J of energy at 700 volts as is required for defibrillators. These limitations-prevented the necessary high peak voltage of short duration required for such devices for implanted human medical use.

Another significant limitation of ceramic capacitors is the ferroelectric effect where capacitance has in the past fallen off very sharply with increased DC bias voltage. For example, where capacitance might be in the range of 4.75 $\mu f$ at 20 volts, it might fall to 1.35 $\mu f$ at 200 volts and 0.7 $\mu f$ at 340 volts. By way of contrast, for implantable devices a capacitor must operate at least at 700 volts without significant reduction in its capacitance. Thus, because of this striking ferroelectric effect, ceramic capacitors have not previously been thought to be applicable to implantable medical devices requiring a relatively high energy output.

SUMMARY OF THE INVENTION

Broadly speaking, the multilayer ceramic capacitor fabricated in accordance with this invention satisfies the requirements for implantable medical devices and, more particularly, has electrical characteristics which have, until now, been thought to be impossible for a multilayer ceramic capacitor. The product of the invention is a full-ceramic, high-energy (FCHE) capacitor. It satisfies all of the requirements previously met by electrolytic capacitors, and more, as will be evident hereinbelow.

The capacitor of this invention has a size which is a fraction of the size of electrolytic capacitors currently being used for implantable medical devices, weighing no more than 30 grams and being about 0.06 inch thick, about 1.5 inch wide and about 2.0 inches long. Its electrical characteristics include a high dielectric constant (k) of at least about 28,000, a extremely low leakage current of no more than 10 pico amps, an extremely low dissipation factor (DF) of about 0.01%, a low equivalent series resistance of less than 0.1$\Omega$, and a high voltage standoff of about 1,000 volts per 0.001 inch of dielectric material. Its energy density of about 15 J/cc makes the capacitor of this invention a very significant improvement over prior art capacitors used with implantable medical devices. In contrast with the electrolytic capacitor, requiring about 28 cc for an energy output of 30 J, the ceramic capacitor of this invention has an output of 30 J in only a 2 cc volume. And finally, an expected operating life of more than 50 years makes this capacitor ideal for medical implants.

The composition of the ceramic body portion of the invention comprises a commercially available base body formulation of lead magnesium niobate with the following as important adders or dopants, ranging from 0.02% to 2% for the respective constituents: lithium niobate; copper oxide; magnesium titinate; maganese niobate; and zirconium oxide. The method of forming the capacitor of the invention uses a green tape ceramic approach, rather than the thick film process. The capacitor is formulated by layers made from the above composition, each layer being approximately 0.0015 inch thick, coupled with alternating layers of electrode material with standard terminations, and provides a finished product having the electrical characteristics mentioned above.

BRIEF DESCRIPTION OF THE DRAWING

The objects, advantages and features of this invention will be more readily perceived from the following detailed description, when read in conjunction with the accompanying drawing, in which.

DETAILED DESCRIPTION OF THE PREFERRED EMBODIMENTS

Figure 1:
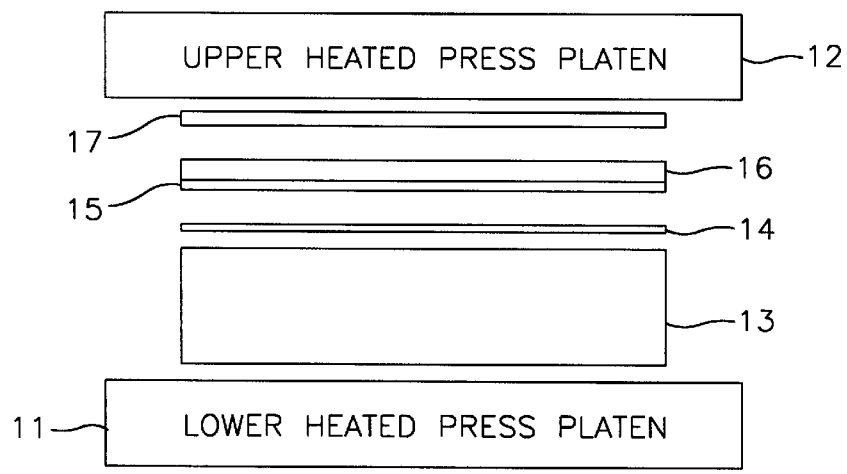
FIG. 1 is an exploded side view of a preliminary step in the process of fabricating the multilayer ceramic capacitor of the invention.

In order to completely and adequately described the multilayer ceramic capacitor of this invention, it will be necessary to describe the process for making the capacitor.

The description of an exemplary test procedure which can be employed with the lead maganese niobate dielectric composition base powder ($PbMg_{1/3}Nb_{2/3}O_3$) used for the capacitor of the invention will be adequate for purposes of this description. Other procedures may be effective. A sample of approximately one-half pound of the dielectric base composition powder is mixed with several organic constituents to achieve a spreadable dispersed colloidal suspension or slurry. These organics function as liquifiers, binders and plasticizers. For this product, these are ethanol, deionized water, butyl benzyl phthalate, nonylphenol polyethylene glycol ether and polyvinyl butyral resin. The amounts of these organic constituents are based on a percentage of the weight of the dielectric composition and are as follows:

about 25–40% ethanol, with 35% being preferred, about 5–15% deionized water, with 10% being preferred, about 0.5–2.0% butyl benzyl phthalate, with 1.5% being preferred, about 0–12% nonylphenol polyethylene glycol either, with 5% being preferred, and about 6–12% polyvinyl butyral resin, with 8% being preferred.

The ethanol helps to liquify the base powder and the resin, and is easily evaporated out of the mixture. This mixture is hydroscopic and the deionized water is added to reduce any tendency it would have to absorb moisture in an uncontrolled way. Butyl benzyl phthalate, available from Monsanto Chemical Company under the trade name Santicizer 160, is a plasticizer which keeps the ceramic pliable and handleable in its green tape form. The glycol either is a surfactant which assists in evenly dispersing the fine base powder throughout the mixture. The resin acts as a binder, holding the ceramic together in its green tape form. It is available in several formulations from Monsanto Chemical Company under the trade name Butvar. The B-79 formulation is presently preferred.

This mixture is ball milled in a standard ball mill for about 12 hours. The ball mill used includes resin coated balls in a resin coated jar. The resulting colloidal dispersion is then cast as a tape about 0.004 inch thick with a conventional tape caster which applies the thin coating of the mixture, using a doctor blade, to a thin sheet, such as polyester film sold under the trade name Mylar. Using standard process and electrode materials, a one inch by one inch two-layer capacitor is formed from the ceramic tape. This capacitor is electrically tested for dielectric constant, which, at this stage, should be at least 15,000 to 18,000, and for dissipation factor, which should be less than about 0.01%. The parameters are easily determined, using a standard bridge measurement instrument. Capacitance and DF are measured directly. The formula for calculating dielectric constant is:

$$C = T/KA \qquad \text{(Eq. 1)}$$

where

C is capacitance,

A is the active area of the electrodes, and

T is the thickness of the ceramic layer between the electrodes.

The dielectric constant, K, can easily be determined from all the other available factors. If the electrical characteristics are not met, the batch is discarded. If they are met, the base body batch is then used to form capacitors in accordance with the invention.

To form the actual ceramic material from which the capacitor of the invention is made, any desired amount of dielectric composition which has been tested to be satisfactory for making the ceramic capacitor of the invention may be employed. As described above, the lead magnesium niobate is mixed with the five organic constituents and an additional five dopants, the latter being important parts of the final product. These dopants are sometimes referred to as shifiers or adders. They are employed to shift or adjust parameters of the finished capacitor. The percentages of these five constituents are based by weight on the dielectric composition powder:

about 0.7 to 1.3% Lithium niobate ($LiNbO_3$), with about 1% being preferred, about 0.015 to 0.025% Copper oxide (CuO), with about 0.02% being preferred, about 0.7 to 1.3% Magnesium titanate ($MgTiO_3$), with about 1% being preferred, about 1.7 to 2.3% Maganese niobate ($MnNbO_3$), with about 2% being preferred, and about 0.04 to 0.05% Zirconium oxide ($ZrO_2$), with 0.05% being preferred.

The functions of the $LiNbO_3$ are to maintain a high dielectric constant (K) and to lower the sintering temperature. The purpose of a high dielectric constant is evident to a person of ordinary skill in this technical field, and is well documented herein. Reducing the sintering temperature reduces the amount of energy necessary for that step in the process. By making the sintering temperature less than 1,000° C. the capacitor electrodes can be made of palladium-silver, a much cheaper substance than the platinum electrode material which would be needed with sintering temperatures exceeding 1,000° C.

The copper oxide functions as a grain growth inhibitor during the sintering process, which is described later.

The next two constituents ($MgTiO_3$ and $MnNbO_3$) have important functions with respect to the Curie point of the ceramic capacitor. The Curie point is the point of maximum capacitance, lowest dissipation factor (DF) and lowest equivalent surge resistance (ESR). Therefore, it is a purpose of this invention to develop the capacitor in such a way that in use, it operates at the Curie point. The Curie point of the dielectric composition by itself is about 10° C. For implantable devices, it is important that the Curie point match the human body temperature (37° C.) as closely as possible for the reasons stated above. These two constituents establish the Curie point centered at 37° C., and at the same time broaden the Curie point ±3° C. either side of center. Another function of the magnesium titanate is to compensate for magnesium depletion which occurs during the firing steps. This constituent prevents a parasitic phase from occurring at the firing stage, which would detrimentally affect the electrical characteristics of the capacitor.

A final and very critical constituent of the capacitor is the zirconium oxide. Zirconium oxide is normally not used in ceramic capacitors because it not only reduces the dielectric constant but, more importantly, it is known to have a tendency to poison the whole ceramic so that it effectively turns to dust upon sintering. It has been found that the $ZrO_2$ employed in this ceramic material is critical in a positive sense and that the amount of 0.05% ZrOz cannot be exceeded without the likelihood of having adverse consequences. One unexpected benefit of this level of $ZrO_2$ is that it creates microfractures and makes the entire ceramic structure in its final form more compliant. This combination of compliance and microfractures prevents further propagation of cracks due to voltage overloads and mechanical shock in the final product. Additionally, the $ZrO_2$ also functions as a Curie point shifter.

The mixture described above is referred to as a "slip." This slip is ball milled in a standard ball mill apparatus for about 46 hours. At that point, the particle size should uniformally be less than about 0.4 $\mu M$ in diameter. If upon testing at this stage the stated particle size is not realized, the milling process should be continued until the desired particle size is achieved.

Figure 4:
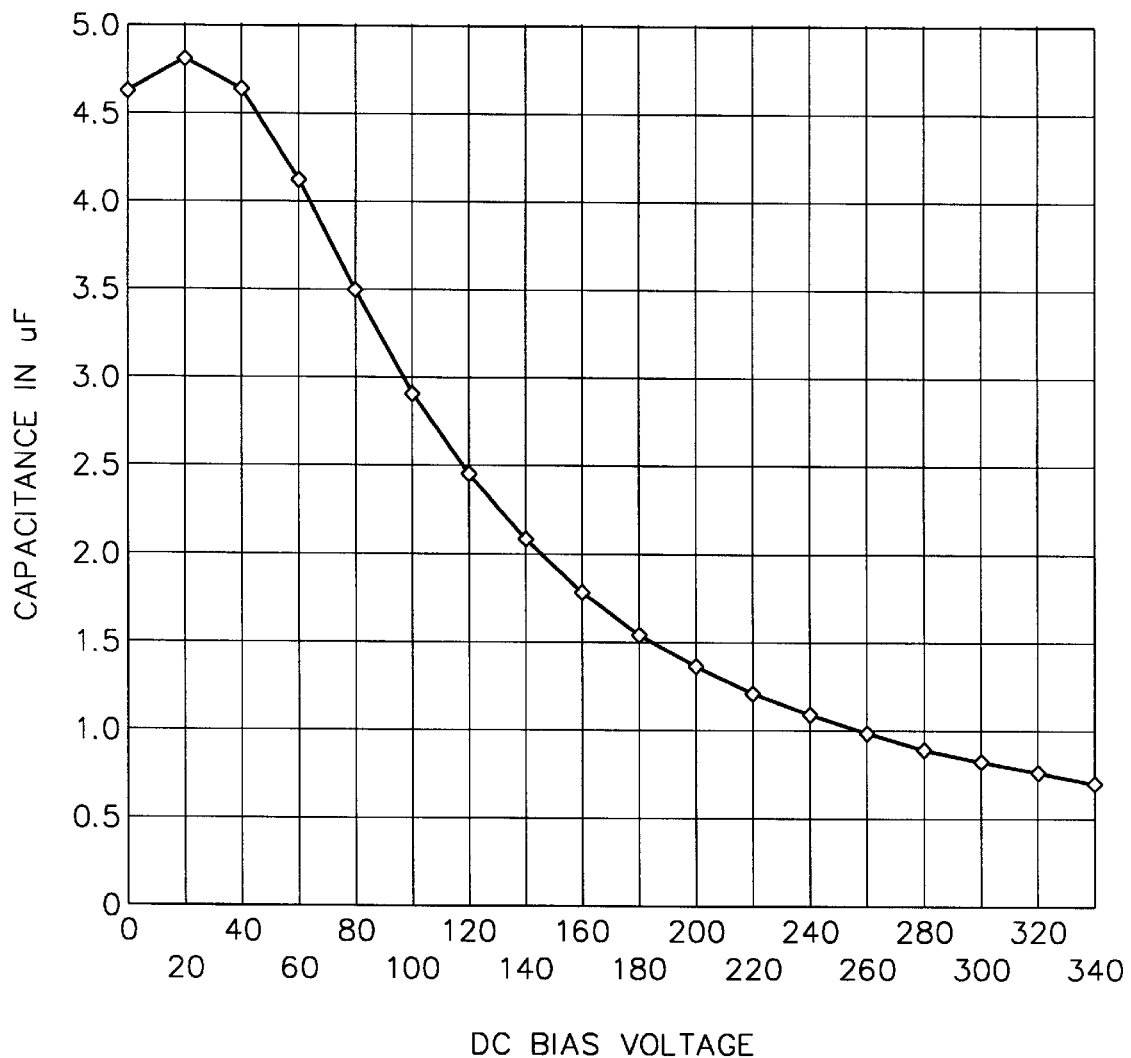
FIG. 4 is a capacitance versus voltage curve of prior art ceramic capacitors exhibiting typical ferroelectric effect.
Figure 5:
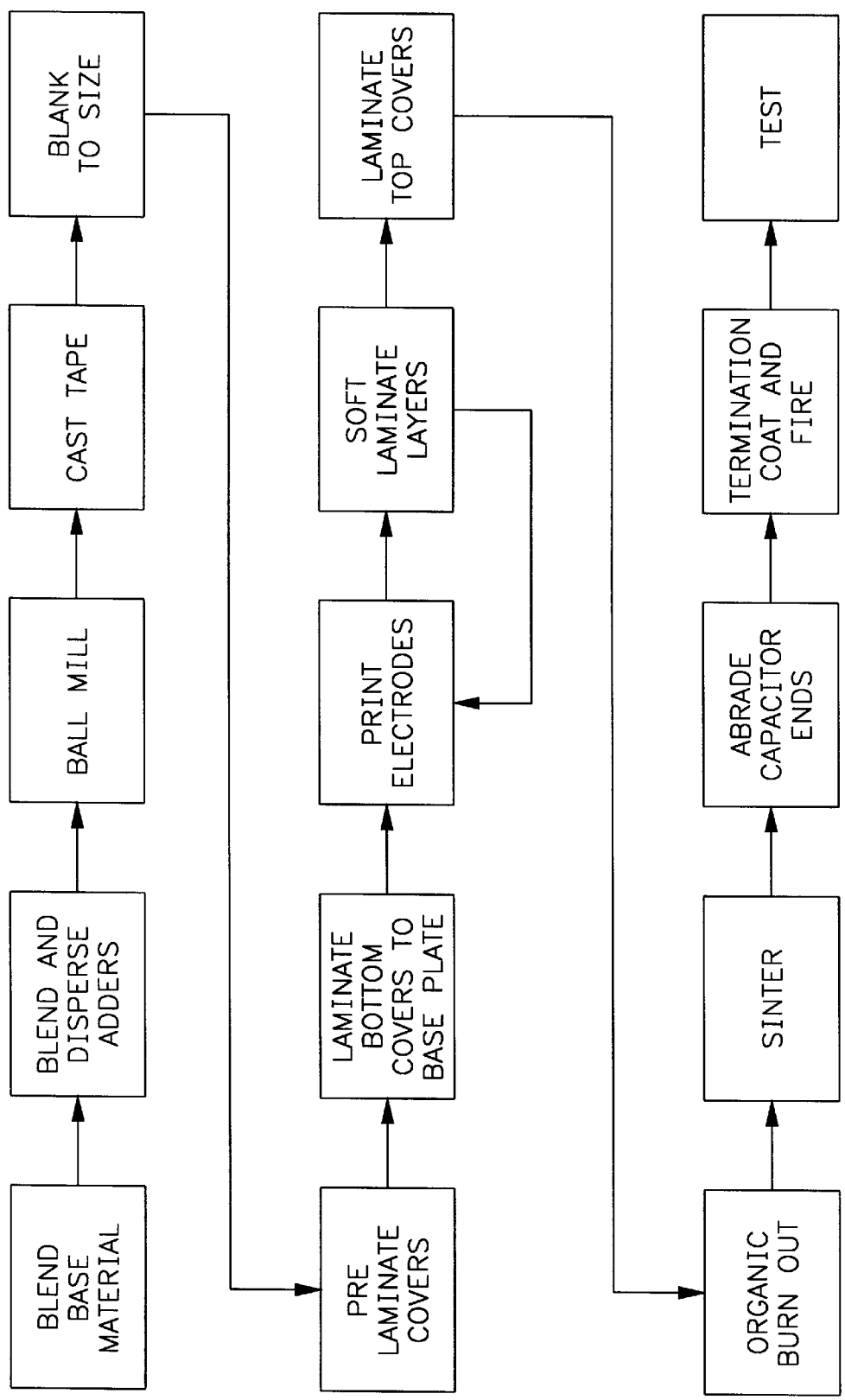
FIG. 5 is a flow chart of the process of the invention.

A very small grain or particle size, together with the dopants, contributes to reduction of both the electrostrictive effect and the ferroelectric effect, which effects reduce capacitance with increased applied voltage. An example of the ferroelectric effect on a typical ceramic capacitor is shown in FIG. 4. Note the very sharp decline in capacitance with increased voltage, starting at the relatively low level of about 40 volts. Over a range of only about 350 volts the capacitance declines about 90%. The capacitor of this invention is capable of maintaining capacitance at a high level throughout its operative range. The capacitance will be reduced by no more than 30% over the entire bias voltage range of 0–1,000 volts.

While reduction in the ferroelectric effect is directly affected by grain size, that is not an unlimited parameter change. That is, there are practical limitations to the effects of reduced grain size. The smaller the grain size, the less likely that the green tape would hold together and it would not sinter properly absent other factors which would counter the reduction in grain size. By contrast, the normal grain size for ceramic capacitors is 1 to 2 $\mu M$. Note that in the capacitor of this invention, the grain size is specified as at least as small as about 0.4 $\mu M$. In actuality 0.4 $\mu M$ is the target, with about 1% of the powder grains being as large as 0.6 $\mu M$, and some being smaller and referred to as "fines." It has been found that in the combination of the dopants it is not presently known which of them, in combination with the fine particle size, contribute the most toward reduction of the ferroelectric effect. However, it is known that the copper oxide, which functions as a grain inhibitor, contributes in a significant way to the great improvement in reducing the ferroelectric effect.

Once the desired grain size is achieved, the slip is cast on a surface such as 0.002 inch-thick Mylar having a silicon coat thereon for easy release of the ceramic material. The tape is cast at about 0.0015 inch thick by conventional means. The tape caster employed is capable of casting ceramic layers ranging between 0.0005 and 0.020 inch thick, and the ceramic layer of this invention can range from 0.0005 to 0.005 inch thick.

When the tape is formed, which may be approximately one foot wide by many feet long on the endless Mylar sheet, the process of actually fabricating the capacitor can commnence. Rigid plastic foundation carrier plates may be used to hold segments of the green ceramic tape for electrode printing and lamination. These foundation plates may be used many times. An example of a suitable foundation plate is 1/8th inch thick acrylic resin sold under the trade name Lucite. The foundation plate is cut into 3 inch squares. Some simple means such as chamfering one corner of the foundation plate may be used for orientation of the plates during printing. It has been found that by coating the operating surface of the foundation plate with polyvinyl alcohol (PVA) the ceramic components are easily released. The PVA is preferably applied to the foundation carrier in three coats using a foam brush.

The green ceramic tape with the Mylar backing is cut into 2 inch squares in a blanking step. The next step in the process is shown in FIG. 1 where lower press platen 11 and upper press platen 12 are heated to about 85° C. Then foundation plate or carrier 13, with its PVA coating 14, is placed on platen 11. One of the squares of ceramic green tape is placed on the PVA coating, ceramic 15 side down with Mylar casting element 16 on top. Soft 1/16th inch thick rubber pad 17 is placed on top of the Mylar faced ceramic, and upper platen 12 then compresses the stack of elements under pressure of about 1,500 psi for about 15 seconds. At this time, the press is opened and Mylar sheet 16 is peeled back, leaving ceramic 15 laminated to PVA coating 14. This procedure may be repeated twice for a total of three ceramic layers laminated between top Mylar sheet 16 and PVA coating 14. This combination of layers comprises the bottom inactive cover layer or element for the final ceramic capacitor.

An equivalent top cover is also formed in the same way. A preferred method for making the covers is to laminate all three ceramic layers simultaneously rather than separately. Of course, three ceramic layers is not an invariable requirement for the covers. At this stage, electroprinting takes place. The electrode material is a standard 70/30 palladium-silver thick film ink. This is conventional material readily available from a number of sources and is in the form of a paste which is 70% silver and 30% palladium. The electrode is screen printed using a 400 mesh stainless steel screen, preferably in such a way that it leaves a grid of holes throughout the surface of the electrode. Thus, after lamination, the top Mylar sheet is peeled off and on top of the third layer of the inactive cover the first electrode is printed. This is typically done by placing the foundation carrier with the three layers of ceramic in a conventional printer, and printing the first electrode pattern. As presently contemplated, the electrode is a sheet covering most of the ceramic surface, leaving a larger margin on one side. It is about 12 $\mu$M or 0.00048 inch thick, ranging between 5 $\mu$M and 14 $\mu$M (0.0002 to 0.00056 inch) thick, and has a hole pattern of 27 holes each way, each hole being in the range of 0.008 to 0.020 inch in diameter, and preferably about 0.012 inch in diameter. This would leave about 8 to 8.5% of the surface not covered with the conductive electrode. After it is screened onto the ceramic surface, this electrode pattern is dried for about 10 minutes at about 75° C.

Figure 2:
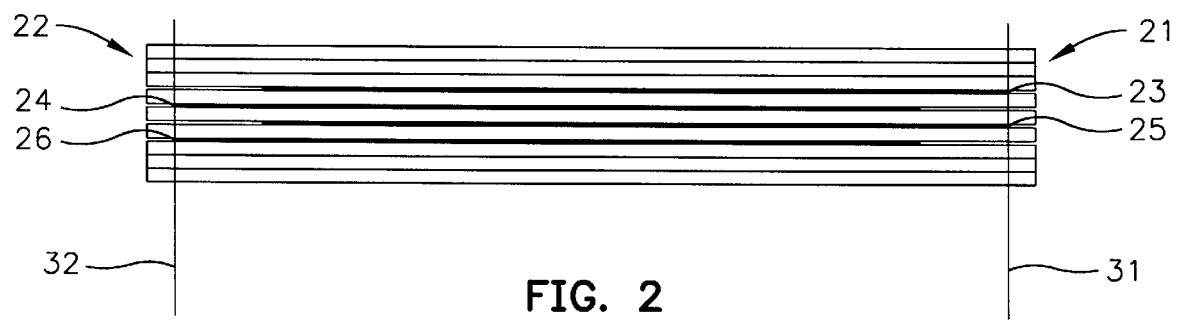
FIG. 2 is a side view of the resultant of several steps in accordance with FIG. 1 to form an example of the capacitor of the invention.
Figure 3:
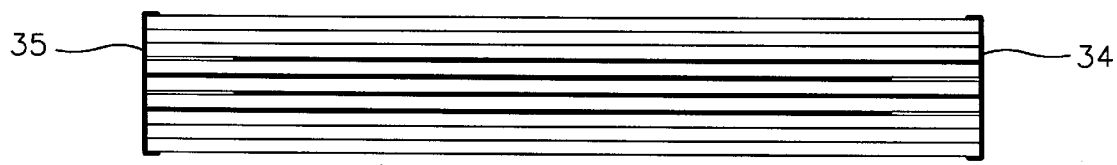
FIG. 3 is a side view of the completed capacitor of FIG. 2 constructed with electrical terminations.

To continue fabricating the capacitor, the foundation plate and the cover layer with the first electrode pattern thereon are placed in the lamination press and a new green tape layer with the Mylar backing still in place is laid on top of the electrode and laminated at about 400 psi for about 15 seconds. The Mylar film is peeled off after the laminating step. The foundation carrier and beguiling capacitor structure are then returned to the printer and shifted in position so that the second electrode pattern is offset slightly from the first, leaving a similar larger margin on the opposite side. This is shown in FIG. 2, where electrodes 23 and 25 are on the right side and electrodes 24 and 26 are on the left side. The second electrode, generally identical in pattern with the first, is then printed on the new ceramic layer from which the Mylar backing has been removed after the ceramic blank has been laminated into position on the top of the last-printed electrode. This procedure is continued until the desired number of layers are laminated. Although only four electrodes are shown in FIGS. 2 and 3, this is exemplary only and a useful capacitor may be comprised of 20 electrode layers. By way of further example, it is contemplated that multilayer ceramic capacitors fabricated in accordance with this invention can have as few as five active layers and as many as 100 active layers. Another inactive cover element of three ceramic layers is laminated to the top of the last electroprinted ceramic layer and placed back in the lamination press for about 1.5 minutes at about 1,500 psi to complete the package.

During the lamination process, ceramic material is forced through the holes in the electrode pattern layers. This provides additional bonding strength, and surprisingly, the holes through the electrode patterns result in further reduction of the ferroelectric effect.

The PVA and ceramic laminate are removed from the foundation carrier for further processing. This is a delicate process and, because the capacitor is still in a green state, must be accomplished very carefully. Since the PVA extends beyond the edges of the capacitor laminate, it can be lifted by applying a piece of transparent tape, or equivalent, to one corner area of the PVA and carefully lifting. This will lift the green capacitor element together with the PVA. The PVA sheet is then carefully peeled from the flat surface of the capacitor. Appropriate means such as a heated knife is used to trim the laminate to the proper size using a conventional sizing tool. Trim lines 31 and 32 in FIG. 2 indicate the portions trimmed off the green capacitor. Note that this trimming step exposes one edge of alternating electrodes 23 and 25 at side 21, and to the other alternating electrodes 24 and 26 at side 22 of the capacitor laminate.

For the step of completion of organic material removal by the application of heat, it is necessary to prepare appropriate setters in which the trimmed green (unfired) capacitors are placed for the heating and sintering steps. Note that about 90% of the organic materials are removed during the tape casting process which includes an air wash commencing at about 110° C. and diminishing in temperature over the length of several feet in an enclosed plenum after the ceramic material has been applied to the Mylar (the tape has been cast), typically in a continuously moving fashion. This is very clean filtered air. The final organic removal process is only necessary for removing the last 10% of the organic materials from the ceramic capacitor. The setters are preferably rigid zirconia elements which can withstand very high temperatures. The upper surfaces on which the green capacitors rest are "sweetened" as described here. The scrap green tape from the trimming and blanking steps is devolved in acetone to make a solution with the viscosity of thick cream. The top surfaces of the zirconia setters are painted with a heavy coat of this material and fired for about 10 minutes at about 1,000° C. This procedure is necessary to create a lead-rich atmosphere during the capacitor firing steps. The lead-rich atmosphere permits proper sintering of the capacitors. It has been found that without a lead-rich atmosphere available during the capacitor firing steps, the capacitors could turn to dust rather than a rigid element being formed.

After the zirconia setters have been sweetened, the green capacitors are placed thereon and inserted into a programmable oven for removal of the organics. The program for the organic removal step, after the green capacitors are placed in the oven, is as follows:

1. Temperature ramp up at about 1° C. per minute, possibly 0.5° to 2.0° C. per minute, to a level of about 300° C. (295° to 310° C.).
2. Maintain the oven temperature at about 300° C. for about 36 hours, ±10%.
3. Temperature ramp up at about 5° C. per minute, possibly 1°–10° C. per minute, to a level of about 450° C., 35 10%.
4. Maintain the oven temperature at about 450° C. for 24 hours, both parameters being ±10%.
5. Ramp down to room temperature at about 30° C. per minute, or as fast as the oven and load will reduce temperature.

As presently contemplated, the above heating program and the sintering program below should be adhered to quite closely. The organic removal process should be accomplished in a nitrogen ($N_2$) environment. The purpose of the nitrogen environment is to aid in sintering. Without the $N_2$, it is possible that the sintering process would effectively destroy, rather than cure the final capacitor.

The partially cured capacitors and setters are removed from the oven and placed in a programmable firing kiln. Alternatively, the firing kiln may be the same as the oven used for the organic removal process. The final sintering steps are as follows:

1. Temperature ramp up at about 20° C. per minute, possibly 10°–30° C. per minute, to about 940° C., ranging up to 960° C.
2. Maintain the kiln temperature at about 940° C., to as high as 960° C. for about 60 minutes, ranging between 40 and 80 minutes.
3. Temperature ramp down at about 20° C. per minute, possibly 10°–40° C. per minute, to 800° C., ranging down to 700° C.
4. Maintain the kiln temperature at about 800° C., and down to as low as 700° C., for about 120 minutes, ranging between 100 and 140 minutes.
5. Turn off the kiln and allow the kiln and contents to cool.

The step at 700°–800° C. is for annealing the sintered capacitor to drive out excess base body material from the grain boundary, in this case excess lead. This improves the K and the DF of the capacitor.

Next the fired capacitors are removed from the kiln and opposite edges are abraded to ensure that the alternating electrode materials are exposed at the opposite edges. A suitable means for abrading the edges is with 220 grit wet or dry sandpaper, which is wetted with isopropyl alcohol to act as a lubricant to reduce clogging of the surface of the sandpaper. Of course, other substances could function satisfactorily. The exposed electrode edges are then dipped into palladium-silver termination material or ink and dried at about 125° C. for about 20 minutes, forming end terminations 34 and 35. The capacitor as thus fabricated is shown in FIG. 3 with alternating electrodes connected to the end terminations after firing. A group of now nearly completed capacitors is again placed on the zirconia setters and fired at about 725° C. for about 11 minutes at temperature. This is an additional sintering step for the electrical end terminations.

At this stage, each capacitor is tested for proper electrical characteristics. The desired parameters are:

1. Breakdown voltage at least 700v, preferably 1000v.
2. Capacitance of 100–150 $\mu$f.
3. Deliver 25–40 J in a 10–20 ms pulse.
4. A volume form factor of 1.5 inches by 2.0 inches by 0.06 inch for a 20–30-layer capacitor.
5. Nominal leakage current $\leq$10 pico amps at 1000v.
6. Energy density greater than about 10–20 J/cc.
7. Operates with these parameters at 37° C.±3° C.

In addition to the electrical characteristics, the size of this capacitor is also an important distinction from prior art ceramic capacitors. Standard surface mount capacitors are typically 0.02 by 0.05 by 0.01 inch in outside dimensions. In the past, attempts to make larger flat, multilayer ceramic capacitors has often resulted in unacceptable warping. The capacitor fabricated in accordance with this invention, and with the constituents identified, can be made at least as large as 1.5 inch by 2.0 inch by 0.06 inch thick and to tolerances and yields as required.

In view of the above description it is likely that modifications and improvements will occur to those skilled in the technical field which are within the spirit and scope of the appended claims.

What is claimed is:

1. A multi-layer high energy ceramic capacitor comprising:
   a plurality of layers of ceramic material comprised of:
      a dielectric composition comprising lead magnesium niobate (PbMg$_{1/3}$Nb$_{2/3}$O$_3$); and
      dopants comprising:
         about 0.7 to 1.3% lithium niobate (LiNbO$_3$);
         about 0.015 to 0.025% copper oxide (CuO);
         about 0.7 to 1.3% magnesium titanate (MgTiO$_3$);
         about 1.7 to 2.3% maganese niobate (MnNbO$_3$); and
         about 0.04 to 0.05% zirconium oxide (ZrO$_2$);
      where the percentages are based on the said dielectric composition as the unit constituent;
   a layer of electrode material between each of a plurality of said ceramic material layers; and
   electrical termination elements interconnecting alternating electrode layers.

2. The ceramic capacitor recited in claim 1, wherein said electrode layers have a multiplicity of holes therethrough in which said ceramic material resides and, in part, bonds adjacent ceramic layers separated by one of said electrode layers together.

3. The ceramic capacitor recited in claim 2, wherein said holes occupy about 8–8.5% of the surface area of each said electrode layer.

4. The ceramic capacitor recited in claim 1, wherein each said ceramic layer is between about 0.0005 and 0.005 inch thick.

5. The ceramic capacitor recited in claim 4, wherein each said ceramic layer is about 0.0015 inch thick.

6. The ceramic capacitor recited in claim 1, wherein each said electrode layer is between about 0.0002 and 0.00056 inch thick.

7. The ceramic capacitor recited in claim 6, wherein each said electrode layer is about 0.00048 inch thick.

8. The ceramic capacitor recited in claim 1, wherein each said ceramic layer is between 0.0005 and 0.005 inch thick and each said electrode layer is between 0.0002 and 0.00056 inch thick.

9. The ceramic capacitor recited in claim 8, wherein each said ceramic layer is about 0.0015 inch thick and each said electrode layer is about 0.00048 inch thick.

10. The ceramic capacitor recited in claim 1, wherein said capacitor has a flat rectangular volume form factor of about 1.5 inch by about 2.0 inch by about 0.06 inch.

11. The capacitor recited in claim 1 having a leakage current of no more than 10 pico amps at 1,000 volts.

12. The capacitor recited in claim 1 having a breakdown voltage of about 700 volts.

13. The capacitor recited in claim 12, wherein the breakdown voltage of said capacitor is 700–1,000 volts.

14. The capacitor recited in claim 1 having capacitance of about 100–150 $\mu$f.

15. The capacitor recited in claim 1, wherein said capacitor is capable of delivering 25–40 J in a 10–20 ms pulse.

16. The capacitor recited in claim 1, wherein said capacitor is comprised of 5–100 active layers.

17. The capacitor recited in claim 1, wherein said capacitor exhibits no more than a 30% reduction in capacitance with applied bias voltages ranging from 0–1,000 volts.

18. The capacitor recited in claim 1, and further comprising a plurality of layers of said ceramic material laminated together on each outside face of said capacitor to function as cover elements therefor.

19. The capacitor recited in claim 1, wherein the grain size of the constituents of said capacitor is about 0.4 $\mu$M in diameter.

20. A multi-layer high energy ceramic capacitor comprising:
   a plurality of layers of ceramic material comprised of:
      a dielectric composition comprising lead magnesium niobate (PbMg$_{1/3}$Nb$_{2/3}$O$_3$); and
      dopants comprising:
         1% lithium niobate (LiNbO$_3$);
         0.02% copper oxide (CuO);
         1% magnesium titanate (MgTiO$_3$);
         2% maganese niobate (MnNbO$_3$); and
         0.05% zirconium oxide (ZrO$_2$);
      where the percentages are based on the said dielectric composition as the unit constituent;
   a layer of electrode material between each of a plurality of said ceramic material layers; and
   electrical termination elements interconnecting alternating electrode layers.

* * * * *